US008856450B2

(12) United States Patent
Beeston et al.

(10) Patent No.: US 8,856,450 B2
(45) Date of Patent: Oct. 7, 2014

(54) SYSTEMS FOR MANAGING A CACHE IN A MULTI-NODE VIRTUAL TAPE CONTROLLER

(75) Inventors: Ralph T. Beeston, Tucson, AZ (US); Erika M. Dawson, Tucson, AZ (US); Duke A. Lee, Tucson, AZ (US); David Luciani, Tucson, AZ (US); Joel K. Lyman, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1031 days.

(21) Appl. No.: 12/693,359

(22) Filed: Jan. 25, 2010

(65) Prior Publication Data
US 2011/0185117 A1 Jul. 28, 2011

(51) Int. Cl.
G06F 12/00 (2006.01)
G06F 12/08 (2006.01)

(52) U.S. Cl.
CPC .......... G06F 12/0866 (2013.01); G06F 12/084 (2013.01); *G06F 2212/213* (2013.01)
USPC ............... 711/130; 711/111; 711/E12.038

(58) Field of Classification Search
CPC .............. G06F 12/084; G06F 12/0866; G06F 2212/213
USPC ................................. 711/130, 111
See application file for complete search history.

(56) References Cited

U.S. PATENT DOCUMENTS

| 5,926,834 A | 7/1999 | Carlson et al. ................. 711/152 |
| 6,189,080 B1 * | 2/2001 | Ofer ............................... 711/167 |
| 6,636,909 B1 * | 10/2003 | Kahn et al. ....................... 710/60 |
| 6,745,212 B2 | 6/2004 | Kishi et al. ..................... 707/204 |
| 6,779,058 B2 * | 8/2004 | Kishi et al. ....................... 710/60 |
| 7,085,895 B2 | 8/2006 | Kishi ............................. 711/135 |
| 7,194,562 B2 * | 3/2007 | Barnes et al. ................... 710/36 |
| 7,243,188 B2 | 7/2007 | Black ............................. 711/111 |
| 7,249,218 B2 * | 7/2007 | Gibble et al. .................. 711/113 |
| 7,272,689 B2 | 9/2007 | Anderson ....................... 711/143 |
| 7,590,803 B2 | 9/2009 | Wintergerst .................. 711/134 |
| 7,590,832 B2 | 9/2009 | Taniuchi |
| 2007/0067573 A1 | 3/2007 | Bruening et al. ............. 711/125 |
| 2009/0043960 A1 * | 2/2009 | Toshine ......................... 711/112 |
| 2010/0199050 A1 * | 8/2010 | LaFrese et al. ............... 711/142 |
| 2012/0239878 A1 | 9/2012 | Beeston et al. |

OTHER PUBLICATIONS

Ly et al., IBM® System Storage TS7700 Virtualization Engine™ TS7720 and TS7740 Release 1.5 Performance White Paper, Apr. 6, 2009.*
U.S. Appl. No. 13/483,827, filed May 30, 2012.
J. Fisher et al., "IBM® Virtulization Engine TS7700 Series Best Practices—Cache Management in the TS7720 V1.1", IBM Technical Document WP101382, Dec. 13, 2008.
G. T. Kishi, "The IBM Virtual Tape Server: Making tape controllers more autonomic" IBM J. Res. & Dev., vol. 47, No. 4, Jul. 2003, pp. 459-469.
Non-Final Office Action from U.S. Appl. No. 13/483,827 dated Oct. 3, 2013.

* cited by examiner

*Primary Examiner* — Aracelis Ruiz
(74) *Attorney, Agent, or Firm* — Zilka-Kotab, PC

(57) ABSTRACT

According to one embodiment, a system includes a virtual tape library having a cache, a virtual tape controller (VTC) coupled to the virtual tape library, and an interface for coupling at least one host to the VTC. The cache is shared by all the hosts, and a common view of a cache state, a virtual library state, and a number of write requests pending is provided to all the hosts by the VTC.

15 Claims, 4 Drawing Sheets

SYSTEMS FOR MANAGING A CACHE IN A MULTI-NODE VIRTUAL TAPE CONTROLLER

BACKGROUND

A virtual tape controller (VTC) is typically a tape management system (such as a special storage device, group of devices, etc.) and software, firmware, etc., which manages data such that the data appears to be stored entirely on data storage cartridges when the data is actually located in faster to operate devices, such as hard disk drives, flash memory, etc. The faster device, in most cases a hard disk storage device, may be called a tape volume cache (TVC).

As with any storage device, there is a limited storage capacity on each VTC. When the cache is full, attempts to store more data fail. When applied to a virtual tape system (VTS), the host can no longer write data to virtual volumes presented to the VTC. Host write jobs will suddenly desist. There are situations currently where users expecting data to be written to VTS's are extremely upset because their business continuity is affected by the condition preempting the data from being written.

There are currently several implementations of cache management features in VTS's. The process in these products is generally to monitor the cache usage for one or more threshold values (such as a "limited cache" state, and an "out of cache" state), and if the cache reaches a threshold value, the VTC can take reactive precautions. For example, in some systems, when the "limited cache" state is reached (warning state), a library state change message is sent to the host to indicate the condition. Host jobs are allowed to continue writing data to the cache. The system does not attempt to slow down the host write jobs in any manner. As soon as the cache usage reaches the "out of cache" state (critical state), another attention message is sent to the attached host. When the critical state is reached, the system fails current write jobs and blocks future writes to the cache. This affects writing information to the cache, and reading information from the cache by the host is not affected.

The "out of cache" state is closely monitored by the system in this example. This state is persistent until the cache usage falls below a threshold, at which time the VTS notifies the host that the "out of cache" and "limited cache" states have been disabled. Host write jobs then resume normally.

In another example, a virtual tape controller that faces the same challenges in managing a limited sized cache is presented. The VTC could potentially use the same fixed threshold values as the previous example, but there are distinct organizational differences that warrant a different method. Perhaps the biggest difference between the present VTC and the previous example is the range of supported cache sizes. The present VTC supports much larger cache sizes. I-lost jobs cannot write to the system's cache when the space used is at or above a threshold of the available cache size, leaving more unused space when the cache size is very large. When this same method is applied to the present system, a large amount of unused space is left, which is essentially wasted space, and is a concern for VTS's with large or very large cache sizes, such as on the order of 40-100 TB.

Moreover, another difference between the two systems is the size of a logical volume. The maximum logical volume size in the previous example is about 25 times smaller than the size of a logical volume in the presently described system. The bigger logical volume size means the host may write more data to the cache on a per device basis, reducing the time associated with demounting the existing volume and loading a new one to the drive. Since the present system may have many devices performing writes simultaneously, on the order of up to 256 devices, all 256 jobs may desist at the same time when the "out of cache" threshold is reached. Since the transition from the "limited cache" state to the "out of cache" state may be reached rather quickly when this large amount of data is being written, a sudden failure to all write jobs may be triggered. This leads to another limitation in the use of the current method for cache management, that sudden failure for all write jobs may be realized since there is no control over how many jobs can write or how quickly the information is written (also known as write throttling) to the logical volumes when warning states are reached, e.g., the lack of host write throttling.

Therefore, a cache management scheme or system which can overcome the problems encountered with currently used devices would be very beneficial to producing continuity for writing to VTS's.

SUMMARY

According to one embodiment, a system includes a virtual tape library having a cache, at least one virtual tape controller coupled to the virtual tape library, and an interface for coupling at least one host to the at least one virtual tape controller. The cache is shared by the at least one host, and a common view of a cache state, a virtual library state, and a number of write requests pending is provided to the at least one host by the virtual tape controller.

A computer program product for managing cache space, in one embodiment, includes a computer readable storage medium having computer readable program code embodied therewith. The computer readable program code is configured to send a first alert to at least one host when a cache free space size is less than a first threshold and entering into a warning state; send a second alert to the at least one host when the cache free space size is less than a second threshold and entering into a critical state; and throttle write requests received from the at least one host when in the critical state by progressively reducing a rate at which data received in the write requests is written to one or more virtual drives such that no write requests are failed while in the critical state.

According to another embodiment, a system includes a virtual tape library having a cache, at least one virtual tape controller coupled to the virtual tape library, and an interface for coupling at least two hosts to the at least one virtual tape controller. The cache is shared by the at least two hosts, and the at least one virtual tape controller enters into a warning state and provides a first alert to the at least one host when a cache free space size is less than a first threshold, the at least one virtual tape controller enters into a critical state and provides a second alert to the at least one host when a cache free space size is less than a second threshold, and the at least one virtual tape controller throttles write requests received from the at least two hosts when in the critical state by progressively reducing a rate at which data received in the write requests is stored to one or more virtual drives in the virtual library such that no write requests are failed while in the critical state.

Other aspects and embodiments of the present invention will become apparent from the following detailed description, which, when taken in conjunction with the drawings, illustrate by way of example the principles of the invention.

DETAILED DESCRIPTION

Figure 1:
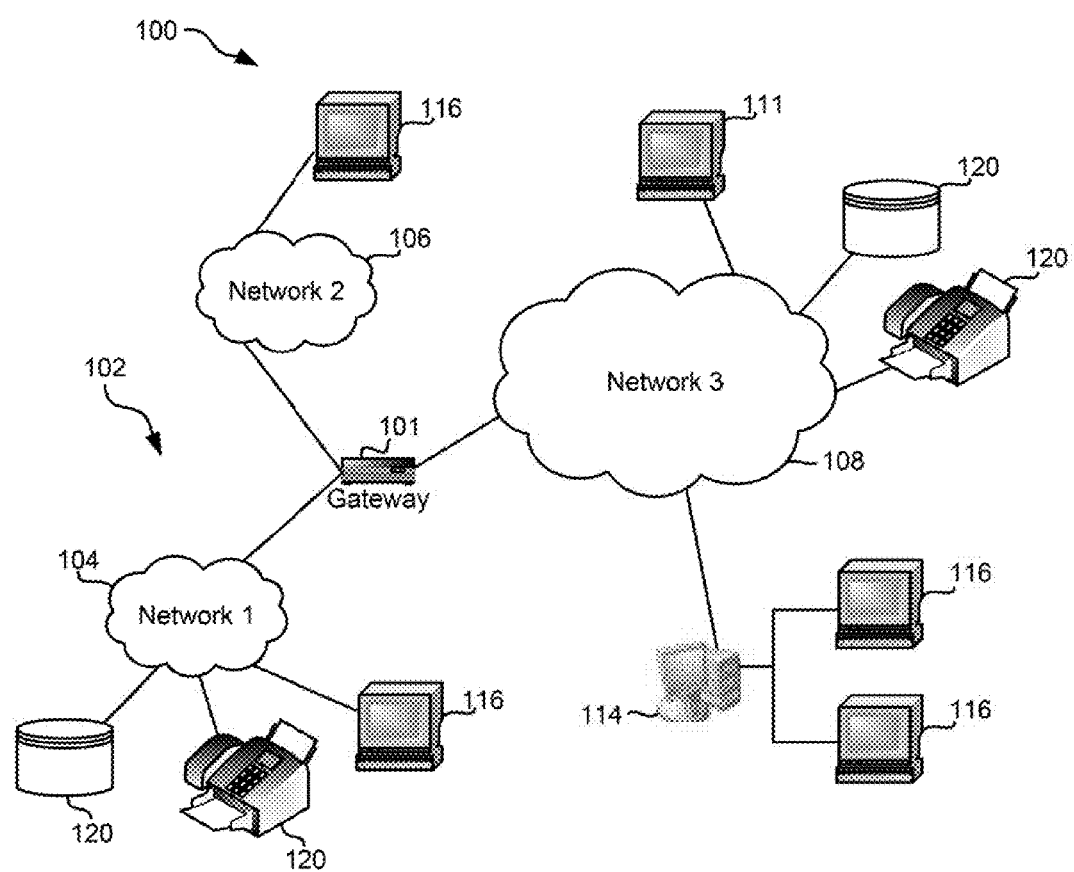
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In one general embodiment, a system includes a virtual tape library having a cache, at least one virtual tape controller coupled to the virtual tape library, and an interface for coupling at least one host to the at least one virtual tape controller. The cache is shared by the at least one host, and a common view of a cache state, a virtual library state, and a number of write requests pending is provided to the at least one host by the virtual tape controller.

In another general embodiment, a method for managing cache space in a virtual tape controller includes receiving data from at least one host using the virtual tape controller, storing data received from the at least one host to the cache using the virtual tape controller, sending a first alert to at least one host when a cache free space size is less than a first threshold and entering into a warning state using the virtual tape controller, sending a second alert to the at least one host when the cache free space size is less than a second threshold and entering into a critical state using the virtual tape controller, and allowing previously mounted virtual drives to continue normal writing activity when in the critical state.

In another general embodiment, a computer program product for managing cache space includes a computer readable storage medium having computer readable program code embodied therewith. The computer readable program code is configured to send a first alert to at least one host when a cache free space size is less than a first threshold and entering into a warning state; send a second alert to the at least one host when the cache free space size is less than a second threshold and entering into a critical state; and throttle write requests received from the at least one host when in the critical state by progressively reducing a rate at which data received in the write requests is written to one or more virtual drives such that no write requests are failed while in the critical state.

In another general embodiment, a system includes a virtual tape library having a cache, at least one virtual tape controller coupled to the virtual tape library, and an interface for coupling at least two hosts to the at least one virtual tape controller. The cache is shared by the at least two hosts, and the at least one virtual tape controller enters into a warning state and provides a first alert to the at least one host when a cache free space size is less than a first threshold, the at least one virtual tape controller enters into a critical state and provides a second alert to the at least one host when a cache free space size is less than a second threshold, and the at least one virtual tape controller throttles write requests received from the at least two hosts when in the critical state by progressively reducing a rate at which data received in the write requests is stored to one or more virtual drives in the virtual library such that no write requests are failed while in the critical state.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

Figure 2:
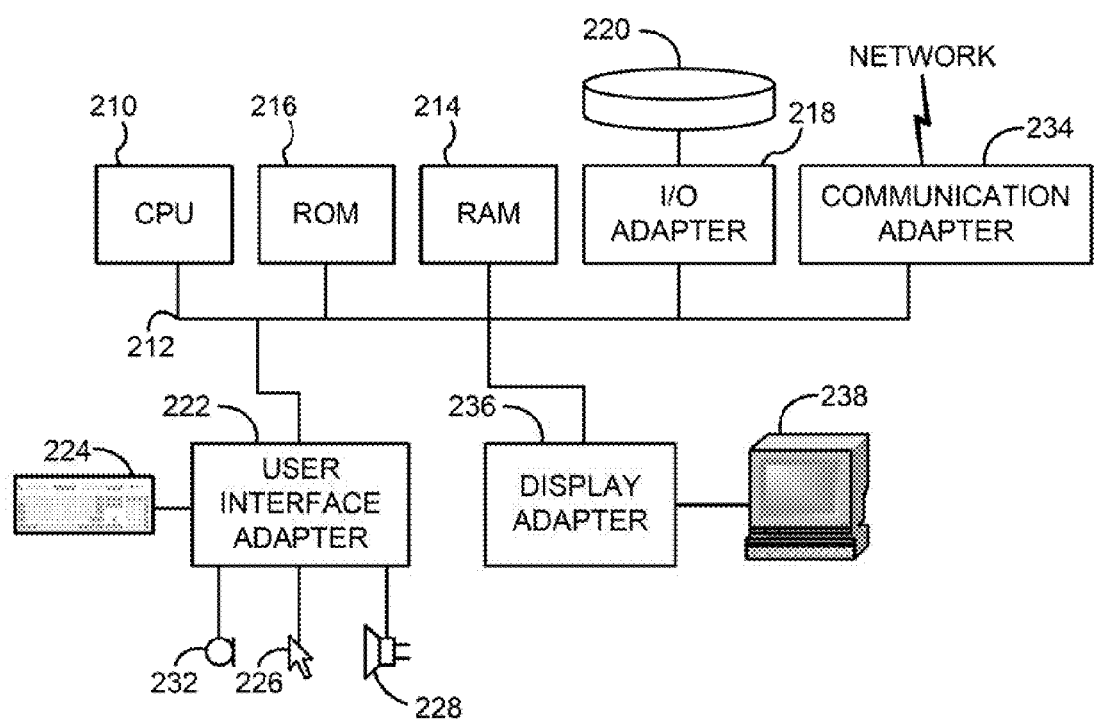
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Referring again to FIG. 2, a typical hardware configuration of a workstation having a central processing unit 210, such as a microprocessor, and a number of other units interconnected via a system bus 212 is illustrated according to one embodiment.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

When a virtual tape controller (VTC) writes information to one or more logical volumes of a virtual tape system (VTS), the information is written to a cache. When the cache is becoming full, conventional methods of cache management do not attempt to slow down the write operations issued by the host. This slowing down of write operations may be referred to as host write throttling. The slowing down of each write operation may prevent the host job from failing when the cache reaches a critical threshold (e.g., "out of cache" state) by allowing the host to cleanup unneeded data from cache, freeing up space for the write jobs that are in progress.

The process of cleaning up unneeded data is known as scratch processing. In some approaches, there is a user interface web page that allows a customer or some other user to setup a fast ready category and a time period in which volumes in a category may have its data expired (expire time). The fast ready category with an expire time set becomes a scratch category, one in which the system will get rid of the data on the volume when the specified expire time is reached. For example, a minimum expire time may be 24 hours in some approaches. When the data expires on a volume, the system scratches the volume by deleting the volume from the cache.

When running out of cache, the scratch processing in the system remains unaffected. In other words, the system honors the expire time set up for a fast ready category. For example, if category 1234 is a fast ready category with an expire time of 24 hours, and the host moves volume 200001 to category 1234, the volume's data may be deleted in 24 hours, since this is the expire time. If the system enters the "limited cache" state, even though cache is running out of free space, the system will not automatically delete the volume Z00001 until 24 hours later. If the host tries to free up cache space, an explicit eject of Z00001 would have to be issued. When the system gets the eject command, the volume Z00001 is deleted immediately. As noted above, when the cache management method of the current systems is applied to a system having much larger cache and volume sizes, there are limitations. Improvements can be made to more effectively manage the cache when free space is running out so that host write jobs do not fail, as are discussed in more detail below.

DEFINITIONS

VTL—Virtual Tape Library
VTC—Virtual Tape Controller
VTS—Virtual Tape System
Remaining_free_space—This is the amount of remaining cache space reported by the VTL.
Num_write_jobs—This is the number of currently mounted drives that either: were mounted with the Scratch Volume indicator, or are currently in write mode.
Scratch_delay—This is the number of days to delay before deleting the data from a volume that has been marked as scratch by the host.
Scratch_decay—This is the value to indicate if the VTS should immediately delete the data from scratch volumes (ignore the scratch_delay value) when the cache is in the out of cache state.
Write_delay—This is the number of seconds added to each write command while throttling write operations.
PB—One petabyte or 1,000,000,000,000,000 bytes.
TB—One terabyte or 1,000,000,000,000 bytes.
GB—One gigabyte or 1,000,000,000 bytes.
MB—One megabyte or 1,000,000 bytes.

Embodiments

According to some embodiments, a host application may specify which volume should be scratched in a perform library function (PLF) command and the VTC sets the scratch flag and timestamp for the volume in the database. In addition, a customer or some other user may specify how many days to delay before deleting the data after the scratch flag has been enabled. This is referred to as a scratch delay value.

Also, in some approaches, a customer or some other user may specify whether the VTC should automatically delete data from scratch volumes if the "out of cache" state has been entered. This is known as the scratch decay setting. When the scratch timestamp expires, the VTC may issue a command to the VTL to delete the data from the volume. The VTL cache statistics may be monitored through a product specific log page returned by the VTL. The information reported by the VTL may include a remaining free space, a used space, and/or a total space, among other items possibly returned by the VTL. The cache monitoring polling frequency may change depending on the amount of free space reported by the VTL.

In addition, in some embodiments, entry of the "out of cache" state is dependent on the remaining free space and the number of host write jobs in progress, in queue, etc. When the "out of cache" state has been entered and the scratch decay value is set, the VTC will automatically delete the volumes (possibly at a rate of about 10,000 per hour) starting with the oldest scratch timestamps first, and moving chronologically. The write throttling factor, or how long a write operation is delayed by the VTC, may be dependent on the amount of free space reported by the VTL and the number of host write jobs in progress at the present time.

Furthermore, in some approaches, When the VTC is out of cache, scratch mounts are failed, and the system goes into write protect mode where all write requests from the host are failed. However, read operations are allowed.

According to some preferred embodiments, the VTC may have multiple nodes that share the same cache (a cluster). All nodes in the cluster may perform host I/O simultaneously. The VTC allows all nodes to have a common view of the cache state, library state (in particular the "limited cache" and "out of cache" states), and number of write jobs. This allows a common write throttling factor and scratch mount response for all nodes in the cluster.

According to some embodiments, since the VTC is connecting to a VTL with a limited sized cache, the need exists to make every effort to prevent write jobs from failing, due to a cache full condition being reached, resulting in an interruption in information flow. To assist with this effort, the existing VTC library states, "Limited Cache" Free Space and "Out of Cache" Resources, may be used. These states may be saved in the database for reporting to the host.

Limited Cache Free Space

The "Limited Cache" Free Space state warns any attached host systems that the VTC is running low on cache space and that the host(s) should consider taking steps to free up unnecessary data, according to one embodiment. Of course, this threshold may be called by a different name, but in operation, the threshold is met when the cache free space drops to a certain level above that of the "Out of Cache" Resources state. According to some approaches, while in the "Limited Cache" Free Space state, mounts may be serialized so that the VTC knows exactly when to enter the "Out of Cache" Resources state. However, all other library activity continues as normal.

"Out of Cache" Resources

This state indicates that the VTL is running critically low on cache space, according to one embodiment. Of course, this threshold may be called by a different name, but in operation, the threshold is met when the cache free space drops to a certain level below that of the "Limited Cache" Free Space state. According to some embodiments, in this state, all new scratch mounts (as indicated by the Scratch Volume indicator in the mount command) are failed with a completion code and a reason code (Insufficient Cache Space). Mounts that do not indicate a Scratch Volume will still be accepted, but any write commands issued to these volumes will be failed indicating the volume is write-protected. Contrarily, all cartridges that were mounted before entering this state will continue to write successfully. However, while in this state, writes will get slower and slower as free cache space is depleted. Additionally, when this state is entered, unexpired scratch volumes may be deleted immediately (starting with the oldest scratch timestamps) if the "scratch_decay" indicator is set (this is set through SMIT and saved in the database). Scratch data may continue to expire early until there is enough cache space to leave the "Out of Cache" Resources state.

Scratch Processing

Scratch Processing is described herein according to one embodiment. If the Order Flags from the host(s) mount command indicate that this is a "Scratch Volume", a "scratch" attribute for the volume may be set in the database. In addition, a calculated delete expired timestamp may also be set for that volume based on the scratch_delay value set, possibly through use of a menu hosted by the VTC. The VTC may also periodically check to see if any cartridges have exceeded the waiting period, at which point the data needs to be deleted. This periodic checking may be done by a new thread which wakes up periodically (such as every hour, every 30 minutes, if it receives a semaphore, etc.) and gets a list of volumes that have a scratch timestamp, and deletes the ones that have expired. Once the data has been deleted, the scratch timestamp may be cleared. When a cartridge is mounted, the scratch attribute may be cleared before a mount complete status is sent to the host(s). This prevents any timing issues that may happen between a process that is writing the cartridge and a process that is deleting scratch data.

An exemplary timeline is provided below for clarification of events that occur as free space in the cache is nearly depleted:

1. Remaining_free_space>("Limited Cache" Free Space state threshold, such as 3.5 TB)
   Remaining_free_space is monitored periodically (such as every 10 seconds) during health check polling
2. Remaining_free_space<("Limited Cache" Free Space state threshold, such as 3.5 TB)
   Enter the "Limited Cache" Free Space state
   Remaining_free_space is monitored periodically (such as every 10 seconds)
3. Remaining_free_space<((num_write_jobs+1)* (write_job_size_estimate, such as 10 GB) OR Remaining_free_space<("Out of Cache" Resources state threshold, such as 500 GB)
   Enter the "Out of Cache" Resources state
   New scratch mounts are failed
   New private mounts reject any write commands
   All previously mounted drives are allowed to continue write activity normally
   Remaining_free_space is monitored periodically (such as every second)
4. Remaining_free_space<((num_write_jobs)*(min_write_job_size_estimate, such as 1 GB))
   Start throttling writes
   write_delay=0.01*(((min_write_job_size_estimate, such as 1 GB)*num_write_jobs)–remaining_free_space)/1 MB
5. Remaining_free_space>((num_write_jobs)*(min_write_job_size_estimate, such as 1 GB))
   Stop throttling writes
6. Remaining_free_space>((num_write_jobs+25)* (write_job_size_estimate, such as 10 GB))
   Turn off "Out of Cache" Resources state
7. Remaining_free_space>("Limited Cache" Free Space state threshold, such as 3.5 TB)
   Turn off Limited Cache Free Space state.

Free Space Monitoring

The monitoring of free space may be done at different intervals depending on what state the library is in, according to one embodiment. When the VTC is not in either "Limited Cache" Free Space or "Out of Cache" Resources state, a monitoring interval of 10 seconds may be used, according to some approaches. Other intervals include every 5 seconds, every 15 seconds, every 2 seconds, every minute, etc. While in the "Limited Cache" Free Space state, the VTC may monitor free space every 10 seconds. While in the "Out of Cache" Resources state, the VTC may monitor free space more frequently, such as every 1 second, every 2 seconds, etc. When the "Out of Cache" Resources state is entered, the cache monitoring function may notify the scratch monitoring thread that it can start expiring scratch data if the "scratch_decay" indicator is set. The cache space statistics (free and used) are gathered by polling the VTL to return the information, which may be returned in a SCSI log page or some other format. This message may be a product specific command which changes depending on the VTL and/or VTC being used.

Additionally, when the "Out of Cache" Resources state is entered, the cache monitoring function may set an indicator in a shared memory segment. This indicator notifies the Tape Daemon to reject write commands for new mounts. The Tape Daemon may also set an indicator for the VTC to inhibit buffered writes on new mounts so that all write commands go to the Tape Daemon before they are accepted.

When writes are to start being throttled, the cache monitoring function may set a throttling value in shared memory, and the Tape Daemon may use that value as a delay on every write command. This gives the user enough time to cancel any unnecessary jobs, and scratch any unnecessary volumes before they run out of cache space.

Number of "Write" Jobs

After entering the "Limited Cache" Free Space state, any further actions are based on the number of write jobs in progress, according to one embodiment. This is a combination of the number of volumes that were mounted for scratch, and the number of private mounts that are currently in write mode. A private mount is one in which a host issues a mount from a private category, which usually means there is data on the volume (e.g., the host may read or append to the volume after a mount completion). A scratch mount is one in which the host indicates to the VTC that there is no active data on the volume and that the host has the intention of writing data to the volume after a mount completion.

To get the number of volumes mounted for scratch, according to one embodiment, if the Mount command has the Scratch Volume indicator, a drive attribute may be set in the database. To get the number of drives that are in write mode, according to one embodiment, the DEV_WRITE_MODE indicator may be set for device_flags2 in the shared memory segment, and the cache monitoring function may set associated drive attributes in the database before doing its calculation.

Library Monitoring Thread

The Library Monitoring Thread may be used to put free space into shared memory, according to one embodiment. Also, it may get log page(s) from the library, get free space, set "Limited Cache" Free Space state when the cache free space is less than a threshold (such as 3 TB), reset the "Limited Cache" Free Space state when the cache free space is greater than a threshold (such as 3.5 TB), and set/reset the "Out of Cache" Resources state based on a variable, such as lie_OutOfCache( ). In addition, in some approaches, the Library Monitoring Thread may send the operational state change message to the host(s) when each state is set/reset, and set out_of_cache in the shared memory when "Out of Cache" Resources state is entered.

Cache Monitoring Thread

According to some embodiments, the Cache Monitoring Thread may wake up periodically (such as every second) and check for the "Out of Cache" Resources state. Also, when in the "Out of Cache" Resources state, it may call lie_irmmCacheStats, and if there is a scratch_decay, it may wake up the Scratch Monitoring Thread. In addition, in some approaches, the Cache Monitoring Thread may call lie_irm-mNumWriteJobs( ) and set throttle_factor periodically (such as each second) in the shared memory.

Tape Daemon

The Tape Daemon; according to some embodiments, may look at throttle_factor on each write, and may look at out_of cache on each mount to set Write Protect.

Mounts

On each scratch mount, a good initial status may be sent while the operational state is looked at for the "Out of Cache" Resources state. If this state is found, a completion code indicating that the mount failed and a reason code indicating it failed because the "Out of Cache" Resources state was encountered may be sent.

Figure 3:
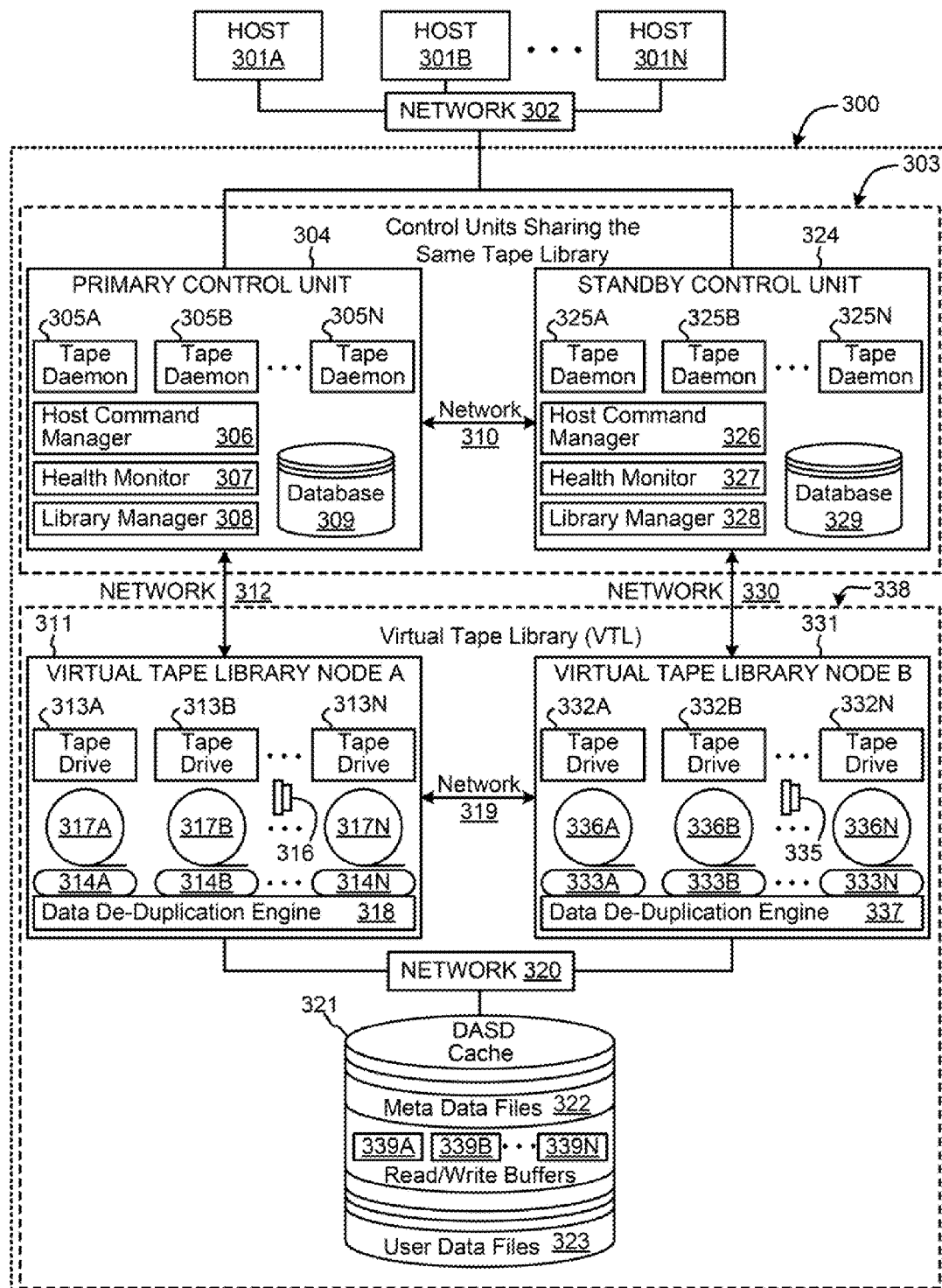
FIG. 3 depicts a detailed block diagram of a tape network, according to one embodiment.

Now referring to FIG. 3, according to one embodiment, a detailed block diagram of a tape network is shown including a tape subsystem comprising two control units and a tape library. In FIG. 3, a block diagram of a tape management system is also shown. The approaches and embodiments described herein may be implemented in the context of functionality of the tape storage system 300, or in any desired environment. According, the embodiments and approaches described herein are not limited to the structure shown in FIG. 3. Tape storage system 300 includes a control unit cluster 303 and a virtual tape library 338. The control unit cluster 303 may have a primary control unit 304 and a standby control unit 324. The virtual tape library (VTL) 338 has a virtual tape library node A 311, a virtual tape library node B 331, and a DASD cache 321. One or more host system(s) (301A, 301B, . . . 301N) is linked to the control unit cluster 303 via a network connection, e.g., TCP/IP, LAN, Ethernet, WLAN, the IBM® Enterprise System Connection (ESCON) (not shown), etc.

In one embodiment, host system(s) 301A, 301B, . . . 301N may be computer systems, such as personal computers, workstations, mainframes, etc., that are linked to the control units 304 and 324 via one or more ESCON channels. In other embodiments, TCP/IP connections or Ethernet connections may be used. Control units 304 and 324, in one embodiment, are computer systems including one or more processors, such as personal computers, workstations, mainframes, etc. Control unit 304 is linked to virtual tape library node A 311 via a network connection 312, e.g., TCP/IP, LAN, Ethernet, fibre channel, etc. Control unit 324 is linked to virtual tape library node B 331 via a network connection 330, e.g., TCP/IP, LAN, Ethernet, fibre channel, etc. Control units 304 and 324 may have a common view of the VTL 338. The VTL 338 is linked to the DASD cache 321 via a network connection 320, e.g., TCP/IP, LAN, Ethernet, fibre channel, etc. The DASD cache 321 may preferably include one or more logical volumes stored as (user) data files 323. The DASD cache 321 also includes meta data files 322 used by the VTL 338 to manage the user data 323. In one embodiment, the DASD cache 321 may include a plurality of hard disks that are spaced into a redundant array of inexpensive disk (RAID) arrays.

VTL 338 may include a plurality of tape drives, generally designated tape drives 313A, 313B, . . . 313N and 332A, 332B, . . . 332N, such as International Business Machines (IBM®) TS1100, Jaguar 3592 tape drives, or any other tape drive known in the art, including virtual tape drives, according to some embodiments. Generally, a removable storage volume, e.g., a virtual data storage cartridge 317A, 317B, . . . 317N and 336A, 336B, . . . 336N, is loaded into each of the tape drives. Tape drives 313A, 313B, . . . 313N in virtual tape library node A 311 are serviced by an accessor 316, such as a virtual accessor when using virtual tape drives, which simulates the action of transferring selected virtual data storage cartridges 317A, 317B, . . . 317N between tape drives 313A, 313B, . . . 313N and their corresponding virtual storage shelves 314A, 314B, . . . 314N within a data storage cartridge repository. Tape drives 332A, 332B, . . . 332N in virtual tape library node B 331 are serviced by a virtual accessor 335 which simulates the action of transferring selected virtual data storage cartridges 336A, 336B, . . . 336N between tape drives 332A, 332B, . . . 332N and their corresponding virtual storage shelves 333A, 333B, . . . 333N within a data storage cartridge repository.

It is noted that the variable identifier "N" is used in several instances in FIG. 3 to more simply designate the final element (e.g., tape drives, 313A, 313B . . . 313N, and data storage cartridges, 317A, 317B, . . . 317N) of a series of related or similar elements (e.g., tape drives and data storage cartridges). The repeated use of such variable identifiers is not meant to imply a correlation between the sizes of such series of elements, although such correlation may exist. The use of such variable identifiers does not require that the series of elements has the same number of elements as another series delimited by the same variable identifier. Rather, in each instance of use, the variable identified by "N" may hold the same or a different value than other instances of the same variable identifier.

Each node of the VTL 338 may also include a data de-duplication engine. For example, virtual tape library node A 311 contains data de-duplication engine 318 and virtual tape library node B 331 contains data de-duplication engine 337, in the embodiment shown in FIG. 3. The data de-duplication engine functions to compress the user data 323 before storing to the DASD cache 321. The data de-duplication engines 318 and 337 also store meta data files 322 on the DASD cache 321 to allow the VTL 338 to construct the original user data for a particular logical volume.

Virtual tape data storage system 300 includes a cluster of two control units 304 and 324 that share the same VTL 338. Although not shown, there can be any number of control units in the cluster, up to a last number N as previously described. All control units may have access to the same library resources, and thus, may coordinate the usage of resources such as tape drives and cartridges. One control unit in the cluster acts as a primary control unit and another may be designated the standby control unit. The primary control unit 304 includes an active database 309, a host command manager 306, a health monitor 307, and an active library manager 308. Similarly, standby control unit 324 includes an active database 329, a host command manager 326, a health monitor 327, and an active library manager 328. All control units in the cluster that require database access direct their requests to the primary control unit 304. Furthermore, all control units that require a library function to be performed also direct these requests to the primary control unit 304. For example, if control unit 324 wants to mount a cartridge 336A, 336B, . . . 336N to a tape drive 332A, 332B, . . . 332N, the request is forwarded to the library manager 308 of the primary control unit 304. After the cartridge 336 is mounted, control unit 324 may now perform tape input/output (I/O) requests by the host(s) 301. Also, should the primary control unit 304 fail for some reason, the standby control unit 324 may assume the duties as the primary control unit.

According to some embodiments, a system includes a virtual tape library having a cache, at least one virtual tape controller coupled to the virtual tape library, and an interface for coupling at least one host to the at least one virtual tape controller. The system may be similar to the virtual tape data storage system 300 as shown in FIG. 3, but is not so limited. The cache is shared by the at least one host, and a common view of a cache state, a virtual library state, and a number of write requests pending is provided to the at least one host by the virtual tape controller. In this manner, each host views the same real time status of the library and cache, thereby eliminating crosstalk issues and other problems seen in conventional systems.

In some approaches, the interface may configured to couple at least two hosts, such as two hosts, three hosts, ten hosts, etc., and the cache is shared by all of the hosts. Once again, in this manner, each host views the same real time status of the library and cache, thereby eliminating crosstalk issues and other problems seen in conventional systems.

In one embodiment, the at least one virtual tape controller may enter into a warning state and may provide a first alert to the hosts when a cache free space size is less than a first threshold. Also, the at least one virtual tape controller may enter into a critical state and may provide a second alert to the hosts when a cache free space size is less than a second threshold. The first threshold and the second threshold may be set by a user, automatically set by the VTC, set based on a percentage of a cache size, be based on an amount of used space, etc. Also, the first and second thresholds may be dynamic, such that the threshold value changes depending on some factor(s), such as remaining cache size, number of pending write requests, amount of processor usage, etc.

According to some approaches, the at least one virtual tape controller may allow previously mounted virtual drives to continue normal writing activity when in the critical state. This allows for normal operation on private mounts even when cache free space is extremely limited.

In more approaches, the at least one virtual tape controller may throttle write requests received from the at least one host when in the critical state by progressively reducing a rate at which data received in the write requests is stored to one or more virtual drives in the virtual library such that no write requests are failed while in the critical state. This allows for the VTC to recover from a situation where a conventional system would fail all write requests. Instead of failing write requests from the hosts, this system may throttle down the writing rate based on one or more factors, such as the number of write requests pending and the cache free space. In addition, the system may delete one or more scratch mounts either in response to a user action, or automatically based on some predetermined factors, such as length of time designated scratch, priority level of the information stored, etc. In a further embodiment, the at least one virtual tape controller may calculate a write delay value associated with each write request received from the at least one host, the write delay value equaling $0.01*((1\ GB*N)-FS)/(1\ MB)$ where N is a number of write requests pending and FS is the cache free space. This write delay value may be used to determine how long to wait before performing the write request.

Figure 4:
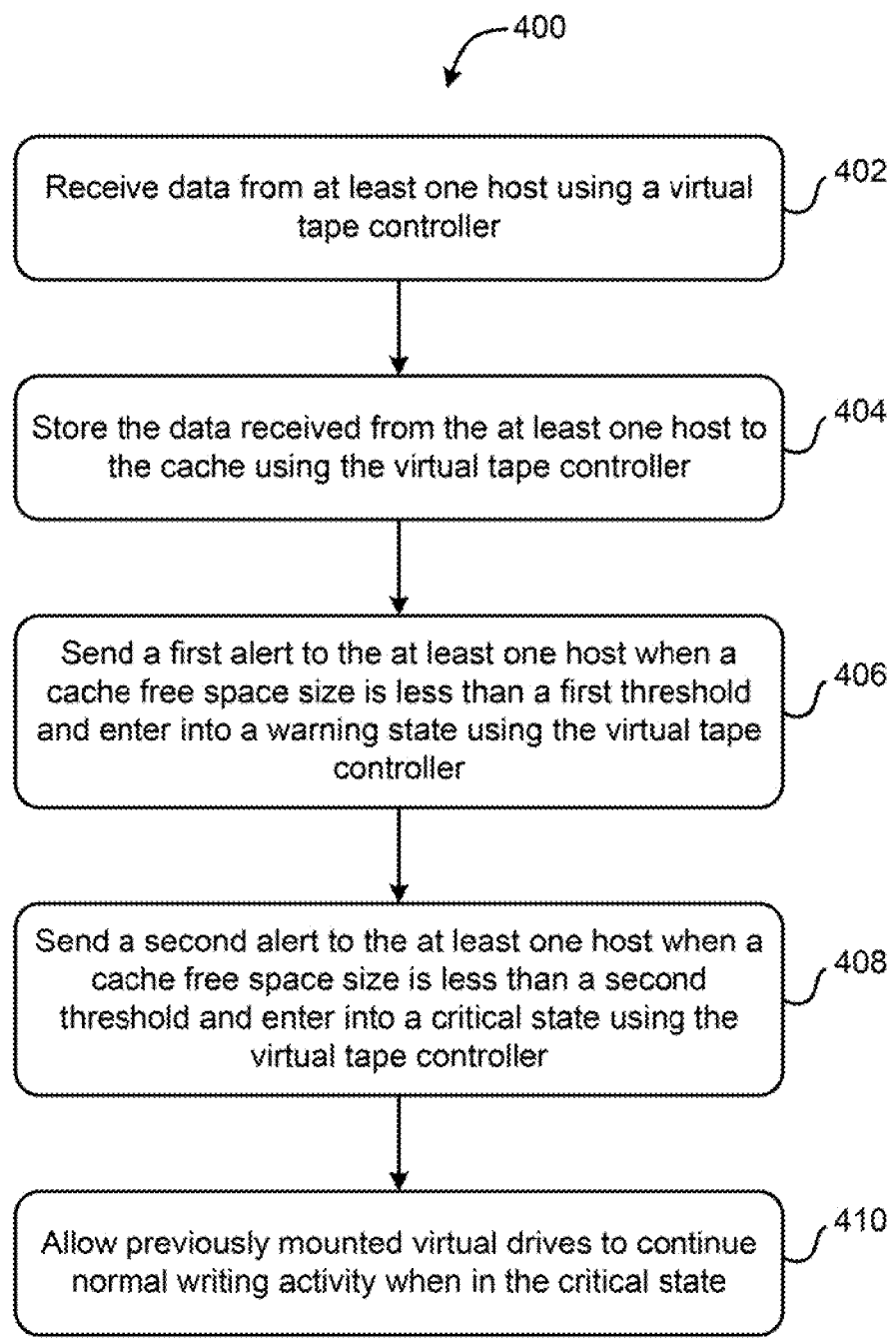
FIG. 4 is a flow chart of a method for managing cache space in a virtual tape controller, according to one embodiment.

Now referring to FIG. 4, a method 400 for managing cache space in a virtual tape controller is described, according to one embodiment. The method 400 may be carried out in any desired environment, including that shown in FIG. 3, and may include more steps not shown in FIG. 4.

In operation 402, data is received from at least one host using the virtual tape controller.

In operation 404, the data received from the at least one host is stored to a cache using the virtual tape controller.

In operation 406, a first alert is sent to the at least one host when a cache free space size is less than a first threshold and a warning state is entered into using the virtual tape controller.

In operation 408, a second alert is sent to the at least one host when the cache free space size is less than a second threshold and a critical state is entered into using the virtual tape controller.

In operation 410, previously mounted virtual drives are allowed to continue normal writing activity when in the critical state.

According to some approaches, the method 400 may further include monitoring the cache free space size at least once every ten seconds when in the warning state. Also, the cache free space size may be monitored at least once every two seconds when in the critical state.

In some approaches, new write requests may be rejected on private mount virtual drives when in the critical state. In more approaches, new scratch mount requests received from the at least one host may be failed when in the critical state. A private mount is one in which a host issues a mount from a private category, which usually means there is data on the volume (e.g., the host may read or append to the volume after a mount completion). A scratch mount is one in which the host indicates to the controller that there is no active data on the volume and that the host has the intention of writing data to the volume after a mount completion.

In some more approaches, write requests received from the at least one host may be throttled when in the critical state. The throttling may include progressively reducing a rate at which data received in the write requests is written to one or more virtual drives such that no write requests are failed while in the critical state. In some approaches, the throttling may include calculating a write delay value associated with each write request, the write delay value equaling $0.01*((1\ GB*N)-FS)/(1\ MB)$ where N is a number of write requests pending and FS is the cache free space.

Also, in some embodiments, the method 400 may include exiting the critical state when the cache free space is greater than the second threshold plus a first predetermined value that is not zero. In addition, the method 400 may include exiting the warning state when the cache free space is greater than the first threshold plus a second predetermined value that is not zero.

In one embodiment, a computer program product for managing cache space includes a computer readable storage medium having computer readable program code embodied therewith. The computer readable program code may be configured to: send a first alert to at least one host when a cache free space size is less than a first threshold and entering into a warning state; send a second alert to the at least one host when the cache free space size is less than a second threshold and entering into a critical state; and throttle write requests received from the at least one host when in the critical state by progressively reducing a rate at which data received in the write requests is written to one or more virtual drives such that no write requests are failed while in the critical state.

Of course, the computer program product may further include computer readable program code configured to: monitor the cache free space size at least once every ten seconds when in the warning state; and monitor the cache free space size at least once every two seconds when in the critical state.

In more approaches, the computer program product may include computer readable program code configured to reject new write requests on private mounted virtual drives when in the critical state. In some approaches, the computer program product may include computer readable program code configured to allow previously mounted virtual drives to continue normal writing activity when in the critical state.

According to some additional embodiments, the computer program product may include computer readable program code configured to fail new scratch mount requests received from the at least one host when in the critical state.

In one embodiment, the computer program product may include computer readable program code configured to throttle write requests further comprises computer readable program code configured to calculate a write delay value associated with each write request, the write delay value equaling 0.01*((1 GB*N)−FS)/(1 MB) where N is a number of write requests pending and FS is the cache free space. Additionally, in some approaches, the computer program product may include computer readable program code configured to exit the critical state when the cache free space is greater than the second threshold plus a first predetermined value; and exit the warning state when the cache free space is greater than the first threshold plus a second predetermined value, where the predetermined values are not zero.

In another embodiment, a system includes a virtual tape library having a cache, at least one virtual tape controller coupled to the virtual tape library, and an interface for coupling at least two hosts to the at least one virtual tape controller. The cache is shared by the at least two hosts, and the at least one virtual tape controller enters into a warning state and provides a first alert to the at least one host when a cache free space size is less than a first threshold, the at least one virtual tape controller enters into a critical state and provides a second alert to the at least one host when a cache free space size is less than a second threshold, and the at least one virtual tape controller throttles write requests received from the at least two hosts when in the critical state by progressively reducing a rate at which data received in the write requests is stored to one or more virtual drives in the virtual library such that no write requests are failed while in the critical state.

Also, in some embodiments, the at least one virtual tape controller may calculate a write delay value associated with each write request received from the at least two hosts, the write delay value equaling 0.01*((1 GB*N)−FS)/(1 MB) where N is a number of write requests pending and FS is the cache free space.

In more embodiments, the at least one virtual tape controller may delete at least one scratch volume when in the critical state, and the scratch volume may be chosen based on one or more factors, such as a length of time the scratch volume has been designated scratch, a priority level of the information stored on the scratch volume, and a scratch delay value associated with the scratch volume.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a virtual tape library having a cache;
at least one virtual tape controller coupled to the virtual tape library; and
an interface for coupling at least one host to the at least one virtual tape controller,
wherein the cache is shared by the at least one host,
wherein a common view of a cache state, a virtual library state, and a number of write requests pending is provided to the at least one host by the virtual tape controller,
wherein the at least one virtual tape controller enters into a warning state and provides a first alert to the at least one host when a cache free space size is less than a first threshold,
wherein the at least one virtual tape controller enters into a critical state and provides a second alert to the at least one host when a cache free space size is less than a second threshold,
wherein the at least one virtual tape controller is configured to delete at least one scratch volume when in the critical state, the scratch volume chosen based on at least one of: a length of time the scratch volume has been designated scratch, a priority level of the information stored on the scratch volume, and a scratch delay value associated with the scratch volume.

2. The system as recited in claim 1, wherein the interface is for coupling at least two hosts, and wherein the cache is shared by the at least two hosts, wherein the common view is provided to the at least two hosts.

3. The system as recited in claim 2, wherein a common write throttling factor and scratch mount response are applied by the at least two hosts.

4. The system as recited in claim 1, wherein the at least one virtual tape controller allows previously mounted virtual drives to continue normal writing activity when in the critical state, wherein the at least one virtual tape controller throttles write requests received from the at least one host when in the critical state by progressively reducing a rate at which data received in the write requests is stored to one or more virtual drives in the virtual library such that no write requests are failed while in the critical state.

5. The system as recited in claim 1, wherein the at least one virtual tape controller calculates a write delay value associated with each write request received from the at least one host, the write delay value equaling 0.01*((1 GB*N)−FS)/(1 MB) where N is a number of write requests pending and FS is the cache free space.

6. The system as recited in claim 1, wherein the cache state includes an amount of free space in the cache.

7. A computer program product for managing cache space, the computer program product comprising:
a non-transitory computer readable storage medium having computer readable program code embodied therewith, the computer readable program code comprising:
computer readable program code configured to send a first alert to at least one host when a cache free space size is less than a first threshold and entering into a warning state;
computer readable program code configured to send a second alert to the at least one host when the cache free space size is less than a second threshold and entering into a critical state;
computer readable program code configured to throttle write requests received from the at least one host when in the critical state by progressively reducing a rate at which data received in the write requests is written to one or more virtual drives such that no write requests are failed while in the critical state; and
computer readable program code configured to fail new scratch mount requests received from the at least one host when in the critical state,
wherein the at least one virtual tape controller deletes at least one scratch volume when in the critical state, the scratch volume chosen based on at least one of: a length of time the scratch volume has been designated scratch, a priority level of the information stored on the scratch volume, and a scratch delay value associated with the scratch volume.

8. The computer program product as recited in claim 7, further comprising:
computer readable program code configured to exit the critical state when the cache free space is greater than the second threshold plus a first predetermined value; and
computer readable program code configured to exit the warning state when the cache free space is greater than the first threshold plus a second predetermined value.

9. A computer program product for managing cache space, the computer program product comprising:
a non-transitory computer readable storage medium having computer readable program code embodied therewith, the computer readable program code comprising:
computer readable program code configured to send a first alert to at least one host when a cache free space size is less than a first threshold and entering into a warning state;
computer readable program code configured to send a second alert to the at least one host when the cache free space size is less than a second threshold and entering into a critical state;
computer readable program code configured to throttle write requests received from the at least one host when in the critical state by progressively reducing a rate at which data received in the write requests is written to one or more virtual drives such that no write requests are failed while in the critical state;
computer readable program code configured to monitor the cache free space size at least once every ten seconds when in the warning state; and
computer readable program code configured to monitor the cache free space size at least once every two seconds when in the critical state.

10. The computer program product as recited in claim 9, further comprising computer readable program code configured to reject new write requests on private mounted virtual drives when in the critical state.

11. The computer program product as recited in claim 9, further comprising computer readable program code configured to allow previously mounted virtual drives to continue normal writing activity when in the critical state.

12. A computer program product for managing cache space, the computer program product comprising:
a non-transitory computer readable storage medium having computer readable program code embodied therewith, the computer readable program code comprising:
computer readable program code configured to send a first alert to at least one host when a cache free space size is less than a first threshold and entering into a warning state;
computer readable program code configured to send a second alert to the at least one host when the cache free space size is less than a second threshold and entering into a critical state; and
computer readable program code configured to throttle write requests received from the at least one host when in the critical state by progressively reducing a rate at which data received in the write requests is written to one or more virtual drives such that no write requests are failed while in the critical state, and
wherein the computer readable program code configured to throttle write requests further comprises computer readable program code configured to calculate a write delay value associated with each write request, the write delay value equaling 0.01*((1 GB*N)−FS)/(1 MB) where N is a number of write requests pending and FS is the cache free space.

13. A system, comprising:
a virtual tape library having a cache;
at least one virtual tape controller coupled to the virtual tape library; and
an interface for coupling at least two hosts to the at least one virtual tape controller,
wherein the cache is shared by the at least two hosts, and
wherein the at least one virtual tape controller enters into a warning state and provides a first alert to the at least one host when a cache free space size is less than a first threshold,
wherein the at least one virtual tape controller enters into a critical state and provides a second alert to the at least one host when a cache free space size is less than a second threshold, and
wherein the at least one virtual tape controller throttles write requests received from the at least two hosts when in the critical state by progressively reducing a rate at which data received in the write requests is stored to one or more virtual drives in the virtual library such that no write requests are failed while in the critical state,
wherein the at least one virtual tape controller is configured to monitor the cache free space size at least once every ten seconds when in the warning state; and
wherein the at least one virtual tape controller is configured to monitor the cache free space size at least once every two seconds when in the critical state.

14. The system as recited in claim 13, wherein the at least one virtual tape controller calculates a write delay value associated with each write request received from the at least two hosts, the write delay value equaling 0.01*(1 GB*N)−FS)/(1 MB) where N is a number of write requests pending and FS is the cache free space.

15. The system as recited in claim 13, wherein the at least one virtual tape controller deletes at least one scratch volume when in the critical state, the scratch volume chosen based on at least one of: a length of time the scratch volume has been designated scratch, a priority level of the information stored on the scratch volume, and a scratch delay value associated with the scratch volume.

* * * * *